United States Patent [19]

Yasuhara

[11] 4,392,463
[45] Jul. 12, 1983

[54] DIESEL ENGINE HAVING A DUAL LUBRICATION SYSTEM

[75] Inventor: Seishi Yasuhara, Yokosuka, Japan

[73] Assignee: Nissan Motor Co., Ltd., Yokohama, Japan

[21] Appl. No.: 176,216

[22] Filed: Aug. 7, 1980

[51] Int. Cl.³ .............................................. F01M 1/00
[52] U.S. Cl. .......................... 123/196 M; 123/196 R; 123/73 AD; 184/6.8; 184/6.9
[58] Field of Search ........ 123/196 R, 196 M, 73 AD; 184/6.5–6.9

[56] References Cited

U.S. PATENT DOCUMENTS

| | | | |
|---|---|---|---|
| 2,066,452 | 1/1937 | Bernard | 123/196 R |
| 2,382,006 | 8/1945 | Dusevoir | 184/6.5 |
| 2,580,572 | 1/1952 | McMillan | 123/196 R |
| 3,912,045 | 10/1975 | Morris | 123/196 R |

FOREIGN PATENT DOCUMENTS

| | | |
|---|---|---|
| 45640 | 1/1911 | Austria . |
| 2158203 | 1/1971 | Fed. Rep. of Germany . |
| 621243 | 9/1926 | France . |
| 562487 | 1/1943 | United Kingdom . |
| 725294 | 2/1952 | United Kingdom . |
| 980027 | 2/1963 | United Kingdom . |

OTHER PUBLICATIONS

German Patent Application D1708Ia/46c published Aug. 19, 1954, German Publication "Motorrad," No. 18, 1969, p. 723.

Primary Examiner—Charles J. Myhre
Assistant Examiner—E. Rollins Cross
Attorney, Agent, or Firm—Thompson, Birch, Gauthier & Samuels

[57] ABSTRACT

A diesel engine has a first lubrication system, containing conventional engine oil, used to lubricate that section of the engine subjected to excessive wear—the valve train including the cam shaft, valve lifters, rocker arm, valve stems, etc., and a second lubricant system, utilizing diesel fuel, for lubricating the remaining section of the engine—the crankshaft and associated parts, pistons, connecting rods, etc. By being exposed to crankcase blowby exhaust gases, diesel fuel used to lubricate the crankshaft, etc. absorbs pollutants and contaminants contained therein and recirculates these contaminants through the fuel system to be burned and exhausted. By constantly being lubricated with fresh lubricant, wear on these specific parts is reduced. Frequent lubrication changes have been eliminated because the diesel fuel/lubricant is continuously changed and circulated through fuel system. Since the engine oil and the first lubrication system is not exposed to crankcase blowby exhausted gases, its useful life is prolonged, thus reducing the frequency of required oil changes.

2 Claims, 3 Drawing Figures

FIG. I
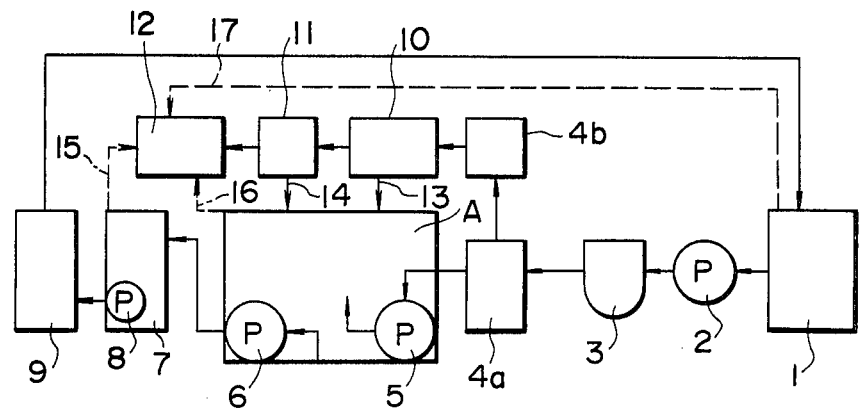
FIG. 2
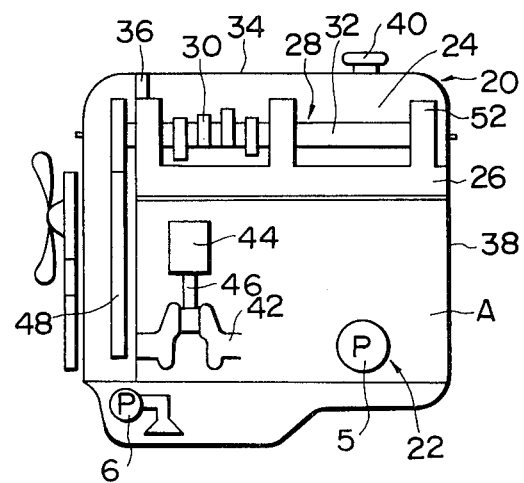

DIESEL ENGINE HAVING A DUAL LUBRICATION SYSTEM

BACKGROUND OF THE INVENTION

1. Field of the Invention

The present invention relates generally to diesel engines adapted to utilize diesel fuel as engine lubricant, and more specifically to a diesel engine having a dual lubrication system comprising a first system utilizing diesel fuel as engine lubricant and a second system utilizing conventional engine oil as engine lubricant.

2. Description of the Prior Art

With recent gradual tightening of emission control regulations, exhaust gas recirculation (EGR) systems have been added to diesel engines. However, since diesel engine exhaust gases contain a large amount of soot and sulfur, EGR systems accelerate the deterioration of engine lubricant oil, making it necessary to change the engine oil at more frequent intervals.

SUMMARY OF THE INVENTION

The dual lubrication system diesel engine of the present invention includes first and second independent lubricating systems. The first lubrication system, containing conventional engine oil, lubricates those parts of the engine that are subjected to excessive wear. The second lubrication system, utilizing diesel fuel as its lubricant, lubricates that section of the engine not subjected to extreme wear—the crankcase section. After serving as an engine crankcase lubricant, the diesel fuel is returned to the fuel tank to be used as diesel fuel to power the engine in the conventional manner. By not being exposed to engine crankcase blowby exhaust gas, the useful life of the engine oil in the first lubrication system is extended. By absorbing pollutants contained in the crankcase blowby exhaust gases, the diesel fuel recirculates those pollutants through the fuel system to be burned in the combustion chamber, thereby filtering these contaminates from the engine lubricant and eliminating lubrication changes in this crankcase section of the diesel engine.

It is accordingly an object of the present invention to provide a dual lubrication system diesel engine having a first lubrication system that prolongs the useful life of engine oil, and a second lubrication system that utilizes diesel fuel to lubricate that section of the engine and then reciculate such fuel through the fuel system to be burned and exhausted, thus eliminating lubricant changes in the crankcase section of the diesel engine.

BRIEF DESCRIPTION OF THE DRAWINGS

The features and advantages of the dual lubrication system diesel engine of the present invention will be more clearly appreciated from the following description taken in conjunction with the accompanying drawings in which like reference numerals designate corresponding elements, and in which:

FIG. 1 is a block diagram of the elements of a diesel engine adapted to utilize diesel fuel as an engine lubricant with which the present invention is concerned;

FIG. 2 is a sectional diagrammatical view of a dual lubrication system diesel engine of the present invention.

DESCRIPTION OF THE PREFERRED EMBODIMENTS

Figure 3:
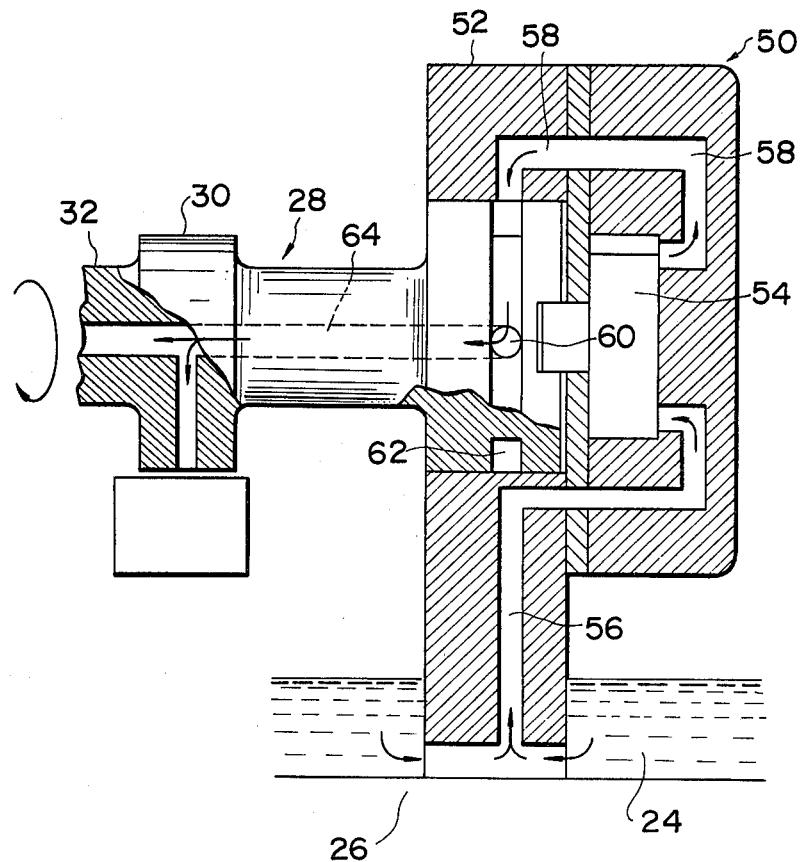
FIG. 3 is a sectional view of a second embodiment of the engine oil lubrication system of the dual lubrication system diesel engine of the present invention.

Turning now to the drawings, and more specifically to FIG. 1, a diesel engine adapted to utilize diesel fuel as engine lubricant is shown in block diagram form. Diesel fuel (or diesel fuel mixed with engine oil) is contained in a fuel tank 1, to be drawn therefrom by a fuel pump 2 and pumped through an oil/water separator 3 and a first fuel filter 4a. From this first fuel filter 4a, diesel fuel separates into two paths: one to a second fuel filter 4b, a fuel injection pump 10, a fuel injection nozzle 11 and into the engine combustion chamber 12; and the other into the lubrication system of the engine via a lubrication pump 5. This lubrication pump 5 circulates the diesel fuel within the engine to lubricate the various moving mechanical parts thereof—the crankshaft, pistons, connecting rods, etc. This diesel fuel having lubricated these various mechanical moving parts is then collected in the oil pan and withdrawn therefrom by a suction pump 6, pumped through an air trap filter 7, a return pump 8, a fuel cooling device 9 and returned to the fuel tank 1.

Excess fuel overflow from the fuel injection pump 10 and the fuel injection nozzle 11 is collected and drained into the engine via an injection pump line 13 and injection nozzle line 14, respectively, to be used as engine lubricant. Any fuel vapor trapped in the engine, the air trap filter 7 or the fuel tank 1 passes through respective ventilation lines 15, 16 and 17 through the engine intake manifold and into combustion chamber 12 to be burned and exhausted.

It should be apparent to those skilled in the art that the diesel engine described hereinabove never requires oil changes because the entire engine is lubricated by diesel fuel which is collected and returned to the fuel tank after having served as a lubricant, to then be used as diesel fuel in the conventional manner. However, in some types of diesel engines, certain of the mechanical moving parts therein are subjected to extreme conditions of accelerated wear, thus requiring a lubricant having a film strength much higher than that of diesel fuel—typically the valve train comprising the cam shaft, rocker arms, valve lifters, etc. With this in mind, the dual lubrication system diesel engine of the present invention is diagrammatically shown in FIG. 2 to comprise a first lubrication system 20 for lubricating a first section of the engine with conventional engine oil, and a second lubrication system 22 for lubricating the remaining section of the diesel engine with diesel fuel, as in the engine described hereinabove. In the preferred embodiment, the first lubrication system 20 using conventional engine oil is of the oil bath type for lubricating that section of the engine subjected to excessive wear. It is shown in FIG. 2 to comprise an oil bath reservoir 24 defined by the upper portion of the engine cylinder head 26. In this embodiment of the dual lubrication system diesel engine, the engine is of an overhead cam type, having a valve train 28, comprising a cam 30, camshaft 32, etc., positioned on the top part of the cylinder head 26 within the oil bath reservoir 24 to be immersed in engine lubricant contained within the oil bath reservoir. An engine rocker arm cover 34 and cover plate 36 also cooperate with the upper portion of the cylinder head 26 to further define the totally enclosed oil bath reservoir 24.

In this embodiment, that section of the diesel engine subjected to excessive wear is the valve train 28; therefore, the first lubrication system 20 utilizes conventional engine oil having a film strength higher than that of diesel fuel as the lubricant.

The second lubrication system 22 is totally separate and independent of the first lubrication system 20, and is essentially the same as that described hereinabove in connection with FIG. 1. The second lubrication system 22 utilizes diesel fuel as the engine lubricant to lubricate those moving mechanical parts of the diesel engine that are not subjected to excessive wear—the engine crankshaft 42, pistons 44, connecting rods 46, timing chain 48, etc. As in the diesel engine described in connection with FIG. 1, the second lubrication system 22 lubricates this specific section of the engine with diesel fuel, and then collects this diesel fuel having been used as an engine lubricant and returns it via the suction pump 6, air trap filter 7, return pump 8 and cooling device 9 to the fuel tank 1 to be used as diesel fuel to power the diesel engine in the conventional manner.

In addition to the diesel fuel serving as an engine lubricant for those moving mechanical parts of the diesel engine not subjected to excessive wear, the diesel fuel also serves as an aid to the EGR system of the diesel engine. Engine lubricant (diesel fuel in the diesel engine of the present invention) being exposed to exhaust gases during lubrication of the crankcase section of the engine, collects soot, sulfur and other exhaust gas pollutants, and recirculates them through the fuel system for more efficient burning in the engine combustion chamber, thus reducing the amount of pollutants released into the atmosphere through engine exhaust.

Since this process of circulating diesel fuel through the main moving mechanical parts of the engine to serve as lubricant therefore is continuous, the main engine parts are constantly lubricated by substantially fresh uncontaminated lubricant. Additionally, since the pollutant recirculation effect of the diesel fuel used as engine lubricant is continuous, there is no chance for pollutants to build up within the diesel fuel/lubricant or otherwise saturate the diesel fuel therewith. Consequently, the diesel fuel/lubricant never needs changing, because of the fact that it is continually being "changed" and replaced with fresh diesel fuel/lubricant, at the same time providing a filtering effect to recirculate pollutants through the engine for more efficient burning thereof, which pollutants would otherwise contaminate the engine lubricant and severely reduce its effectiveness to provide a lubricating film between moving parts of the diesel engine, to protect them from excessive wear.

The first lubrication system 20 lubricates those moving parts of the diesel engine that are subjected to excessive wear. Therefore, the first lubrication system 20 utilizes conventional engine oil as its lubricant. In this embodiment of the dual lubrication system diesel engine of the present invention, conventional engine oil in the first lubrication system 20 lubricates only the valve train 28, and is therefore not exposed to engine exhaust gases, as is the diesel fuel/lubricant used in the second lubrication system 22. Those skilled in the art will readily appreciate that the life of the engine oil can be substantially prolonged due to the fact that it is not exposed to blowby exhaust gas in the engine crankcase or to excessive combustion chamber heat, which tend to contaminate and to deteriorate engine lubricant used to lubricate the crankcase portion of internal combustion engines. Additionally, the first lubrication system 20 of the dual lubrication system diesel engine of the present invention is an oil bath type, which has the beneficial effect of absorbing engine valve train noise, resulting in a quieter engine.

A second embodiment of the dual lubrication system diesel engine of the present invention is shown in FIG. 3 comprising an oil pump 50, rotatably mounted to support the cam shaft 32. The pump 50 comprises a combination camshaft support bracket and pump housing 52 having a pump element 54 therein. In this second embodiment, the pump element 54 is of a trochoid design, and is attached to the cam shaft to rotate therewith to suck oil from the oil bath reservoir 24 through an oil intake passage 56, and pump this oil through an oil delivery passage 58, an annular oil passage 62 and a radial passage 60 formed in the end section or bearing of the cam shaft 32, and through the cam shaft axial oil gallery 64 to be pumped to each of the cam shaft lobes 30 for lubricating the valve lifters, rocker arms, valve stems, etc. in the conventional manner.

In this second embodiment, as in the preferred embodiment, the lubricating oil used in the first lubrication system 20 is enclosed within the reservoir 24 defined by the upper portion of the cylinder head 26 and the rocker arm cover 34. After lubricating the various members of the valve train 28, the oil is collected in the oil bath reservoir 24 for recirculation through the first lubrication system 20 as outlined hereinabove. In this manner, the first lubrication system 20 functions separately and independently of the second lubrication system 22 which utilizes diesel fuel to lubricate the remaining mechanical moving parts of the diesel-engine—the crank shaft, pistons, connecting rods, etc.

What is claimed is:

1. A method of lubricating the working parts of a diesel engine equipped with an exhaust gas recirculation system, said working parts including a valve train whose lubricant is substantially prevented from being exposed to exhaust gases and other working parts whose lubricant may be exposed to exhaust gases, said method comprising:
    lubricating the engine working parts except for the valve train with diesel fuel;
    using the diesel fuel after the same has served as a lubricant for fuel for the engine; and
    lubricating the valve train with a separate lubrication system.

2. A diesel engine equipped with an exhaust gas recirculation system and having working parts including a valve train whose lubricant is substantially prevented from being exposed to exhaust gases and other working parts whose lubricant may be exposed to exhaust gases, said engine comprising:
    a first lubrication system for lubricating the working parts except for the valve train with diesel fuel;
    a fuel system fluidly connected with said first lubrication system for supplying diesel fuel to the first lubrication system, and then using the diesel fuel, which has served as a lubricant, for fuel for the engine; and
    a second lubrication system independent of the first lubrication system for lubricating the valve train.

* * * * *

UNITED STATES PATENT AND TRADEMARK OFFICE
CERTIFICATE OF CORRECTION

PATENT NO. : 4,392,463
DATED : July 12, 1983
INVENTOR(S) : Seishi Yasuhara

It is certified that error appears in the above-identified patent and that said Letters Patent is hereby corrected as shown below:

On the title page Insert

-- (30) Foreign Application Priority Data

August 10, 1979    Japan    54-101833 --.

Signed and Sealed this

Twenty-eighth Day of February 1984

[SEAL]

Attest:

GERALD J. MOSSINGHOFF

Attesting Officer    Commissioner of Patents and Trademarks